Apr. 10, 1923.  B. M. SHORT  1,451,477
AUTOMOBILE BUMPER
Filed Jan. 7, 1922  2 sheets-sheet 1
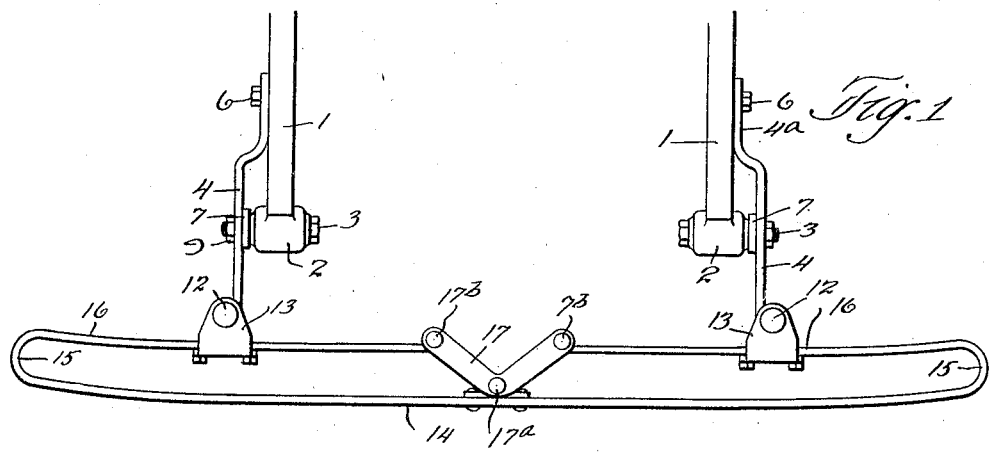
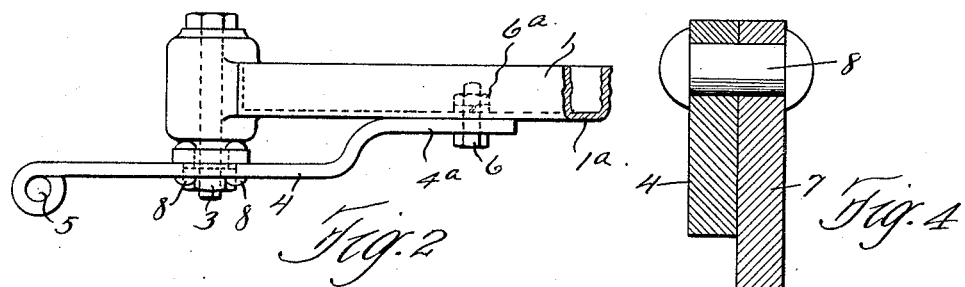
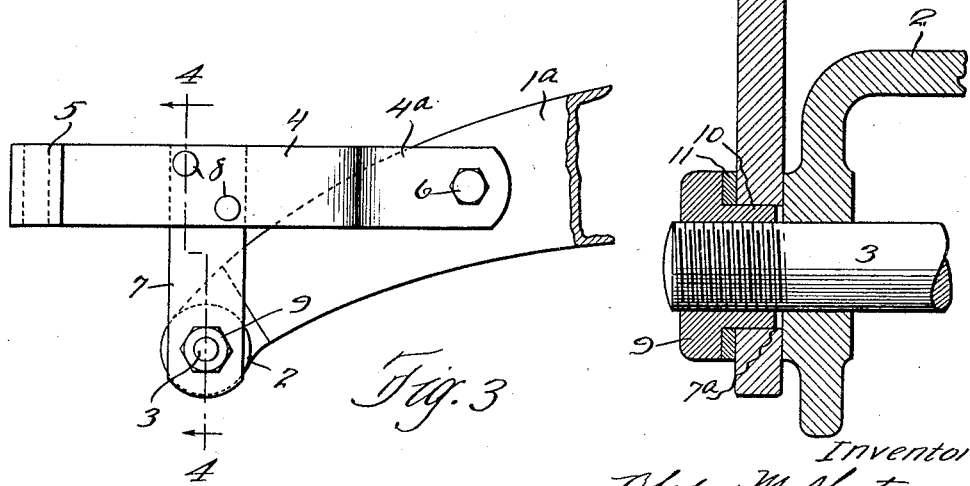
Inventor
Bladen M. Short,
By Hull, Brock & West,
Attys.

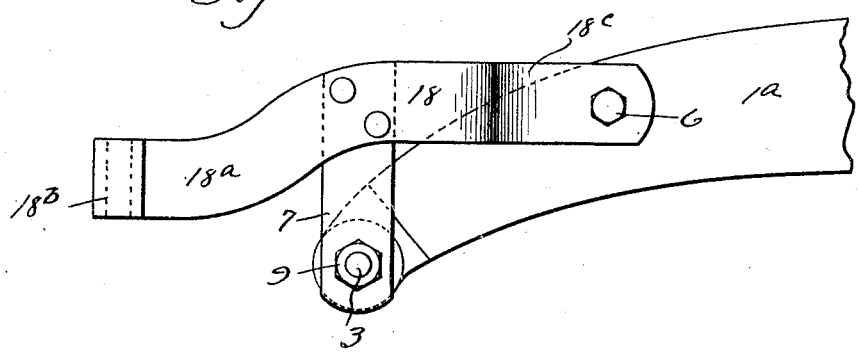
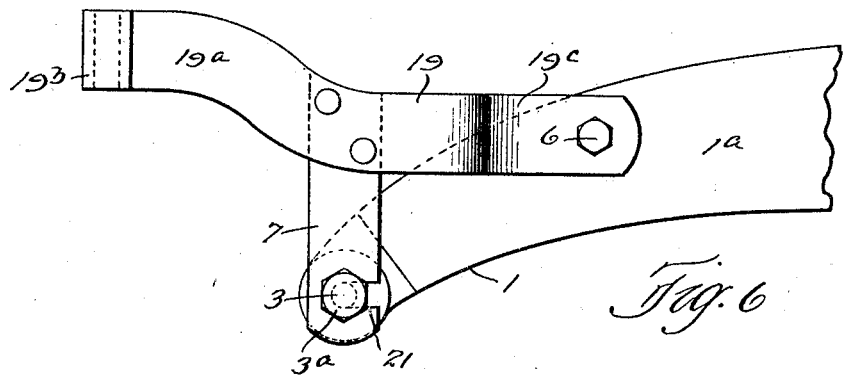
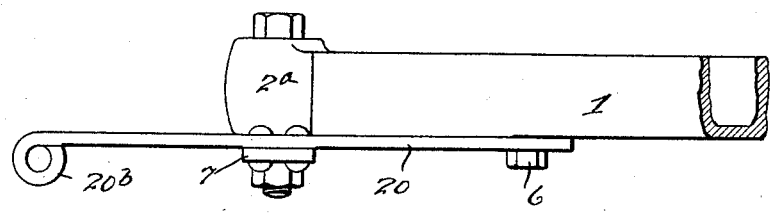

Patented Apr. 10, 1923.

1,451,477

UNITED STATES PATENT OFFICE.

BLADEN M. SHORT, OF DETROIT, MICHIGAN, ASSIGNOR TO CHRISTIAN GIRL, OF KALAMAZOO, MICHIGAN.

AUTOMOBILE BUMPER.

Application filed January 7, 1922. Serial No. 527,562.

*To all whom it may concern:*

Be it known that I, BLADEN M. SHORT, a citizen of the United States, residing at Detroit, in the county of Wayne and State of Michigan, have invented a certain new and useful Improvement in Automobile Bumpers, of which the following is a full, clear, and exact description, reference being had to the accompanying drawings.

This invention relates to automobile bumpers, and more particularly to the means for supporting such bumpers from the ends of the vehicle frame members. The general object of the invention is to provide a supporting means which is economical of production and capable of performing its supporting function in an effective manner and which is readily adaptable for supporting bumpers at the proper height irrespective of variations in the heights of the ends of the side members to which they are attached. A further object of the invention is to provide a supporting means for this purpose which may be connected directly to the end portions of the said side members, above the down-turned extremities thereof, and which will provide a rigid support for the bumper carried thereby. A still further object of the invention is to provide a construction of bumper support and a cooperating means for mounting bumpers thereon which will enable the bumpers to withstand severe blows and shocks. Further and more limited objects of the invention will be pointed out hereinafter and will be realized in and through the combinations of parts embodied in the claims hereto annexed.

In the drawings, illustrating the present preferred embodiment of my invention, Fig. 1 represents a plan view of a bumper and the front ends of the side members of an automobile, and showing my invention and its mode of application to such parts; Fig. 2 an enlarged detail in plan of one of the side members, with one of my supporting members secured thereto; Fig. 3 is a side elevation of the parts shown in Fig. 2; Fig. 4 an enlarged sectional detail corresponding to the line 4—4 of Fig. 3; Figs. 5 and 6 details in elevation, and Fig. 7 a detail in plan, of modified forms of my supporting member.

Describing by reference characters the various parts illustrated herein, and with particular reference to Figs. 1-4 inclusive, 1, 1 denote the opposite side members of an automobile, each of said members having at its front end a spring horn casting or forging 2 providing each a mounting for a bolt 3 by which the eye at the front end of the vehicle spring (not shown) is supported, as is customary.

My bumper supports comprise each a longitudinally extending arm, formed from a bar or plate 4 having at its front end bumper-attaching means, shown as an eye 5, the rear end of each arm being offset inwardly from the body portion thereof whereby it is adapted to bear against the web $1^a$ of the corresponding side member 1 and being connected to such member 1 by a bolt 6 provided with a nut $6^a$ upon the end thereof which is within the side flanges of the channeled side member. Each arm 4 is preferably connected with its side member at such a point as to extend substantially horizontally therefrom in order to support the bumper at the proper height. This, with the ordinary construction of the extreme ends or spring horns of the side members, will result in spacing the body of each of the arms 4 above such extreme ends. To support the arms 4 in proper operative relation to the side frame members and the bumper, a brace 7, consisting preferably of a flat metal plate, is riveted at its upper end to the arm 4, as indicated at 8, and is supported at its lower end from the appropriate spring bolt 3. A convenient and effective manner of supporting such lower end is to provide the nut 9 upon the end of each spring bolt with an inwardly projecting hub 10 which is adapted to enter an aperture $7^a$ near the lower end of the co-operating brace 7 and form with such aperture a support for such brace. Between the head of the nut 9 and the brace 7 and surrounding the sleeve 10 is a lock washer 11.

It will be noted that the outer end of each of the bars or plates 4 is provided with an eye 5. This construction of such end is shown because of the cooperating manner of mounting the bumper, it being most desirable to mount bumpers of the resilient type in such manner that a blow received by any part of the impact portion thereof will be transmitted throughout the length of the bumper, enabling the bumper to withstand and to absorb very severe shocks, thus prolonging the life of the bumper and protecting the vehicle against shocks. In this case, the eye 5 is provided for the reception of the pivot or hinge bolt 12 carried by a clamp 13. Two such clamps are shown, one for each of the arms 4, and these clamps are in turn connected to a bumper comprising a front or impact portion 14 of flat, or springplate, material connected by looped ends 15 with a rear section comprising arms 16 extending nearly to the central portion of the bumper and connected at their inner ends with the central portion of the front or impact section by means of an angle lever 17 pivoted at its center to the central portion of the front section, as indicated at 17$^a$, the ends of the arms 16 being pivotally connected to the opposite ends of the lever arms, as indicated at 17$^b$.

In Fig. 5 there is shown a modification of the supporting arms wherein the arm 18 is bent downwardly at its forward or attaching end, as indicated at 18$^a$, being there provided with an eye 18$^b$, similar to the eye 6. At its rear end, the arm is bent inwardly, at 18$^c$, to contact with the outer surface or web 1$^a$ of the channel member 1. The arm 18 is supported in the same manner as is the case with the arms shown in Figs. 1-4, and the supporting and connecting parts are indicated by the same reference characters as employed upon such views.

In Fig. 6 there is shown a still further modification, wherein the supporting arm 19 differs from the supporting arm 18 in that its outer or attaching end 19$^a$ is elevated instead of being depressed. This arm also has at its inner end offset inwardly so as to bear against the outer surface or web 1$^a$ of the channeled side member 1.

The form of arm shown in Fig. 5 is particularly useful for the purpose of supporting bumpers at the proper or standard distance from the ground where the ends of the side frame members are elevated more than the ordinary distance from the ground; while the form shown in Fig. 6 is particularly useful for supporting bumpers at the proper distance from the ground where the ends of the side frames are abnormally near the ground.

In Fig. 7, I have shown an arm 20 which may be horizontal, or which may have its outer end deflected upwardly or downwardly (as is the case in Figs. 5 and 6). In this view, the arm is not offset in different vertical planes because of the fact that the brace 7 is secured to the outer face of said arm and the outer face of the spring horn casting or forging 2$^a$ is substantially flush with the outer face 1$^a$ or web of the channeled side plate member.

By the construction of bumper support shown and described, a rigid, non-yieldable and non-adjustable support is provided for securing each end portion of the bumper to the corresponding vehicle frame member. It will be evident that these supporting members are efficient in operation in transferring shocks received by the bumper directly to the side frame members and that they are, furthermore, economical of production.

With any of the forms of bumper support illustrated herein, I may provide the brace 7 with a slot 21 extending thereinto from one of the side edges past the center of said brace, the slot being adapted to receive the hub 10. This slot is particularly useful, however, in installations where, as in Fig. 6, the spring bolt 3 is provided at its outer end with a head 3$^a$, the opposite end being tapped into the inner end of the spring horn casting or forging. In assembling, it is necessary only to unscrew the bolt a short distance or to slack off the nut 9, as the case may be, slipping the slot 21 over the bolt or the nut, and fastening the inner ends of the arms 4, 18, 19 or 20 to the side frame by means of the bolt 6. The spring bolt may then be set up in its finally adjusted position.

Having thus described my invention, what I claim is:

1. The combination, with the side member of a vehicle having a spring bolt at its end, of a bumper supporting arm rigidly connected at one end to the side member and projecting beyond the end thereof, a nut mounted upon said bolt and having a hub projection, and a brace mounted upon said hub projection and secured to the said arm.

2. The combination, with the side member of a vehicle having a spring bolt at its end, of a bumper supporting arm rigidly connected at one end to the side member and having an offset portion projecting beyond the end of said side member, and a brace secured to said arm intermediate the ends thereof and mounted upon said bolt.

3. The combination, with the side member of a vehicle having a spring bolt at its end, of an arm having a sleeve at its front end and having its rear end adapted to contact with and be secured to said side member, a brace secured to and depending from the said arm and having an aperture in its lower end, and a nut on said bolt having a hub adapted to fit within the said aperture and form therewith a support for said brace.

4. A bumper supporting member comprising an arm having its inner end offset laterally for attachment to a vehicle side member and having its front end formed for connection with a bumper, and a brace extending from the said arm and adapted for atachement to the spring bolt of such side member.

5. A bumper supporting member comprising an arm having one end provided with an eye and having its opposite end adapted to contact with the side of a vehicle frame member, and a brace secured to the said arm and adapted for connection with a portion of the vehicle frame member located between the inner end of the said arm and the outer end thereof.

6. A bumper supporting member comprising an arm having its inner end adapted to engage the side of a vehicle frame member and to be secured thereto and having intermediate of its ends a brace projecting therefrom and adapted for connection with such side member at a point between the inner end of the supporting member and the outer end thereof.

7. A bumper supporting member comprising an arm having one end adapted for pivotal connection with a bumper and having its opposite end adapted to contact with and be secured to the outer side of a vehicle frame member, and a brace secured to the said arm intermediate the ends thereof and adapted for connection with a portion of the vehicle frame member.

8. A bumper supporting member comprising an arm having one end adapted for attachment to a vehicle side member and having its opposite end formed for connection with a bumper and offset vertically from the first mentioned end, and a brace extending from an intermediate portion of the said arm and adapted for attachment to another portion of said side member.

9. A bumper supporting member comprising an arm having one end adapted for attachment to a vehicle side member and having its opposite end formed for pivotal connection with a bumper and vertically offset from the first mentioned end, and a brace extending from the said arm and adapted for attachment to another portion of said side member.

10. The combination, with a bumper having resilient front and rear sections, of a pair of bumper supporting members each comprising an arm having one end adapted for attachment to a vehicle side member and its opposite end pivotally connected with the rear portion of said bumper, and a brace extending from each arm and adapted for attachment to another portion of its cooperating side member.

11. The combination, with a bumper having a resilient front or impact section and a rear section connected to said front section by looped ends and having its central portion projected forward and connected to the central portion of the front or impact section, of a pair of bumper supporting members each comprising an arm having one end adapted for attachment to a vehicle side member and its opposite end pivotally connected with the cooperating portion of the rear bumper section, and a brace extending from each arm and adapted for attachment to another portion of its cooperating vehicle side member.

12. The combination, with the side member of a vehicle having a spring bolt at its end, of a bumper support comprising an arm secured at one end to the side member and projecting beyond the adjacent end thereof, and a brace secured to said arm and having a slot projecting thereinto by which it is mounted upon and secured to said bolt.

13. A bumper supporting member comprising an arm having one end adapted for attachment to a vehicle side member and having its opposite end adapted for connection with a bumper, and a brace extending from the said arm and having a slot projecting from one side thereof thereinto for attachment to the vehicle spring bolt.

In testimony whereof, I hereunto affix my signature.

BLADEN M. SHORT.